(12) United States Patent
Natanzon et al.

(10) Patent No.: US 11,106,811 B2
(45) Date of Patent: Aug. 31, 2021

(54) OBJECT STORAGE FOR GUARANTEED CONTENT FOR BACKUP AND RETENTION

(71) Applicant: EMC IP Holding Company LLC, Hopkinton, MA (US)

(72) Inventors: Assaf Natanzon, Tel Aviv (IL); Jehuda Shemer, Kfar Saba (IL); Kfir Wolfson, Beer Sheva (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 294 days.

(21) Appl. No.: 16/170,767

(22) Filed: Oct. 25, 2018

(65) Prior Publication Data

US 2020/0134215 A1   Apr. 30, 2020

(51) Int. Cl.
*G06F 3/06*   (2006.01)
*G06F 21/62*   (2013.01)

(52) U.S. Cl.
CPC .......... *G06F 21/6218* (2013.01); *G06F 3/067* (2013.01); *G06F 3/0623* (2013.01); *G06F 3/0652* (2013.01)

(58) Field of Classification Search
CPC ..................................................... G06F 21/60
See application file for complete search history.

(56) References Cited

U.S. PATENT DOCUMENTS

2019/0014176 A1\* 1/2019 Tormasov ........... H04L 41/5019
2019/0236548 A1\* 8/2019 Singi .................... G07G 1/0009

OTHER PUBLICATIONS

International Search Report and Written Opinion dated Sep. 25, 2019 in corresponding PCT application PCT/US2019/044212.
Ali Saqib et al: "Secure Data Provenance in Cloud-Centric Internet of Things via Blockchain Smart Contracts", Department of Computer Science University of Agriculture Faisalabad, Pakistan, Oct. 8, 2018.
Ramachandran et al: "Using Blockchain and smart contracts for secure data provenance management". A 1-20 Sep. 28, 2017.
Xu Xiwei et al: A Taxonomy of Blockchain-Based Systems for Architecture Design, Apr. 3, 2017.

\* cited by examiner

*Primary Examiner* — Olugbenga O Idowu
(74) *Attorney, Agent, or Firm* — Workman Nydegger

(57) ABSTRACT

Systems, apparatus and methods for managing an object's lifecycle in an object store. A distributed ledger is used to record transactions between a client and an object store. The distributed ledger records the transaction and also attests to the object authenticity. Thus, the transactions can be verified and may assist in resolving issues that arise with respect to the stored objects.

17 Claims, 3 Drawing Sheets

OBJECT STORAGE FOR GUARANTEED CONTENT FOR BACKUP AND RETENTION

FIELD OF THE INVENTION

Embodiments of the present invention relate to systems and methods for protecting data and performing data protection operations. More particularly, embodiments of the invention relate to systems and methods for storing objects with confirmed content for storage and retention.

BACKGROUND

Ledger based distributed technologies are widely used for various reasons. However, ledger based technologies still have problems. For example, one of the problems with storing objects (e.g., data, files, content) in a cloud system is that there is no assurance that the object has not been tampered with notwithstanding the use of conventional ledgers. Although signatures and error correction codes can be used to detect corrupted objects, the cloud provider may claim that the object corruption was not the cloud provider's fault and that the user stored the object in a corrupted form.

More specifically, there is no guarantee that objects stored or kept at an untrusted cloud storage will be returned in an identical form. In other words, there is no guarantee that an object read from the cloud system will be identical to the object that was written to the cloud system. For example, a user may store an object in the cloud system. When the same user later reads the object, a different object may be returned from the cloud system. The user cannot prove that the data returned from the cloud is different from the object that was originally stored in the cloud. The user cannot prove that the object became corrupted in the cloud and the cloud cannot prove that the object did not become corrupted in the cloud.

In other words, whenever there is a problem with an object that has been uploaded to and stored in a cloud system, it is very difficult to determine how and when the problem arose. As previously stated, the user may claim that the object was corrupted by the cloud system and the cloud system may claim that the user stored a corrupted object.

Similar problems may arise with respect to objects that have been deleted or not deleted. For example, a user may request an object only to find that the object no longer exists. In this case, the user cannot demonstrate that no delete command was issued. Further, the cloud is not protected from a user that deletes an object only to request the object at a later time. In another example, the user has no assurance that the cloud system will comply with a delete command. This is particularly relevant with some regulations such as (GDPR's "Right to be Forgotten", DMCA takedown), which require certain objects or data to be destroyed. The user may have taken steps to destroy the object but the cloud system did not actually destroy the object—leaving the user liable.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
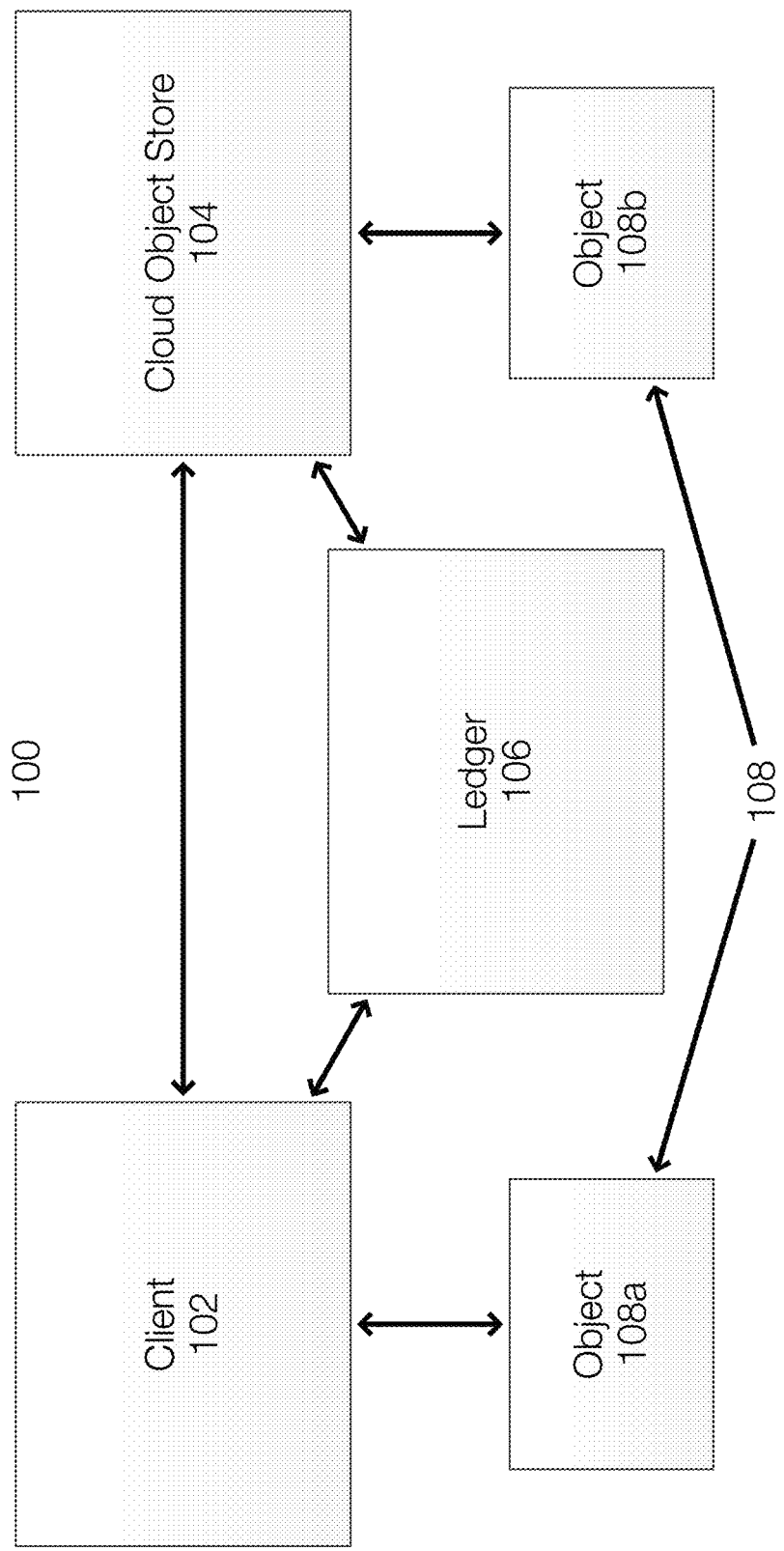
FIG. 1 illustrates and example of a system including a distributed ledger for storing objects and guaranteeing content for backup and retention.

Embodiments of the invention relate to systems and methods for storing objects in a store such as a cloud object store (e.g., AWS S3). A cloud object store may be referred to as the cloud or the cloud system. A datacenter or a distributed datacenter that includes hardware for storing objects may be examples of a cloud object store. The cloud object store, by way of example only, may be a public cloud, a private cloud, or a hybrid could.

Embodiments of the invention further relate to storing objects in a manner that guarantees that the objects written to the cloud object store (referred to herein as cloud or cloud storage) will be returned as originally written or that the object will be deleted in accordance with a delete command. If the guarantee is broken, embodiments of the invention enable the source of the problem with the object to be determined and allow appropriate remedies to be provided. In one example, if the object is not returned as originally written (e.g., a corrupted or partially corrupted state) or if the object is not deleted in accordance with a delete commend, embodiments of the invention enable the transaction to be verified and fault to be determined. This is achieved using, by way of example, smart contracts and ledgers. Embodiments of the invention, by way of example, thus allow a cloud object store to be used as backup or for backup purposes and allow for the retention and management of objects in a cloud object store.

Embodiments of the invention further relate to a distributed ledger that manages the life cycle or status of objects stored in the cloud object store. A ledger or a distributed ledger may be embodied as a database that allows transactions to be noted or stored. A distributed ledger may be or include data that is replicated, shared and/or synchronized across multiple sites. In some examples, a distributed ledger may not have a centralized administrator.

The distributed ledger, in accordance with embodiments of the invention, attests to the object itself in addition to or in conjunction with recording a transaction. Thus the ledger, in addition to stating that object Y was stored in the cloud object store, may also include an identifier (e.g., a hash) that allows the integrity of the object to be verified. Thus, the ledger attests to the object itself and attests to the contents of the object. Further, entries in the ledger may be made using smart contracts. A smart contract is a protocol that allows the negotiation or performance of a contract to be digitally facilitated, verified or enforced. A smart contract may involve the use of private/public keys. For example, an entry made in a ledger using a private key can be confirmed using the corresponding public key. This allows an identify of a user to be confirmed and allows contracts to be valid in a computing context. Using smart contracts, entries in the distributed ledger can become valid and enforceable.

Embodiments of the invention allow transactions to be recorded and also allow the integrity of the object to be guaranteed at least initially. If an object is subsequently corrupted or not present or if a command related to the object is not performed or performed without authorization, the distributed ledger allows the client and the cloud to determine who bears responsibility.

When storing an object (e.g., writing an object to a cloud object store), for example, a client (or the user) may add information to a distributed ledger that an object has been written to the object store. The client may also specify or provide a signature of the object (e.g., a hash signature or a fingerprint that uniquely identifies the object). The client may also digitally sign the fingerprint and/or the object to facilitate a smart contract. The client or user may also provide or define a retention policy for the object (how much time the object must stay available) and availability requirements (e.g., 99.999%). These may constitute part of a contract or agreement being made with respect to the object.

As the object is stored in the cloud object store, the cloud system (or cloud provider) is notified of the ledger transaction. In response, the cloud object storage acknowledges that the object has been received and that the signature of the object as set forth in the ledger is correct. For example, the cloud storage may also perform a hash (the same hash performed by the client) in order to verify that the object received is the object purportedly uploaded by a client. The cloud may also agree to the retention and availability requirements (and/or other requirements). Of course, the cloud storage may also ignore or reject the request or the notification of the ledger transaction. This allows both the client to know that the cloud system received the correct object and not a corrupted object and also allows the cloud system to verify what was actually uploaded by the client.

If the cloud storage accepts the transaction, storing the object in the cloud object store ensures the conditions set forth in the transaction and a smart contract may be formed. The cloud provider may even agree to pay a fine or provide other compensation or remedy if the object is not available according to the availability requirements or if the object is later found to be corrupted. In one example, the object may be encrypted with a key known only to the client or user. When accepting the transaction, the cloud provider may check the hash of the encrypted object. The hash of an encrypted object can be used to verify whether the encrypted object became corrupted in the cloud. A similar process may be performed for objects that are not encrypted. In other words, embodiments of the invention can be performed regardless of whether the object is encrypted or not.

When reading an object from the cloud storage, a client may read the object from the cloud object store and the related transaction from the ledger, which may also specify the hash method. The client can calculate or determine the hash of the read object to determine whether the object being read is corrupted or different from the object reflected in the ledger. If the object does not exist or if the client determines that the retrieved object is not identical to the object that was written to the cloud storage, the client or user may receive compensation or other remedy.

In one example, a trusted third party may be used as an arbitrator. The third party may be given access to the user's or client's cloud object store and the ledger. An application programming interface (API) can be used to immediately read the object from the cloud object store and check if the object is indeed missing or corrupted. If the third party service agrees that that the service level agreement (SLA) for the object is not satisfied, the cloud provider may be required to provide a predetermined remedy according to the agreement.

When deleting an object, a client (or the user) may ask the cloud storage to delete an object by placing a delete request in the ledger along with the object's identifier or hash. The client may, at the same time, ask the cloud storage to delete the object (e.g., by selecting an object and pressing delete or by dragging the object to a trash or in other manner). After deleting the object, the cloud storage will acknowledge in the ledger that the object was deleted. This ensures that the client will not try to read deleted objects and ensures that deleted objects are deleted (at least from the client's perspective), which may free a user from liability. In one embodiment, the cloud may check the ledger for delete requests (e.g., when a delete command is not specifically received by the cloud storage) or commands asynchronously and delete such objects even if the command or request did not come from the user.

FIG. 1 is a block diagram illustrating an example of a computing environment in which embodiments of the invention may be implemented. FIG. 1 illustrates a client 102. The client 102 may be a computing device such as a computer, a tablet device, a smartphone, or the like and may include a processor, memory, and other circuitry. The client 102 may communicate with a cloud object store 104 or servers associated therewith over a network such as the Internet. The cloud object store 104 may store objects from multiple clients and may include various storage devices. The cloud object store 104 may be a datacenter or other collection of processors, memory and other hardware and circuitry such as switches, hardware interfaces, etc.

In this example, the client 102 stores an object 108 in the cloud object store 104. The object 108 is represented as object 108*a* and object 108*b*. The object 108*a* represents the object as the object is written to or uploaded by the client 102 to the cloud object store 104. The object 108*b* represents the object 108 as stored in the cloud object store 104. Ideally, the object 108*b* is identical to the object 108*a*.

Embodiments of the invention ensure that the object 108*b* is identical to the object 108*a* and ensure that, if a discrepancy is found, the entity at fault can be identified. This is achieved, in one example, using a ledger 106, which may be a trusted or untrusted distributed ledger. The ledger 106 may be a distributed database for example.

The ledger 106, in addition to noting that a transaction occurred (e.g., client 102 wrote object 108 to the cloud object store 104), also records information that allows the object and its state (e.g., corrupted, safe, missing) in the cloud object store 104 to be determined. The ledger 106 advantageous prevents at least some potentially fraudulent activity.

More specifically, for a given transaction, the ledger may include information from both the client 102 (and/or the user) and the cloud object store 104 (the cloud provider). The ledger includes the transaction and allows the transaction to be verified, valid, and/or enforceable. In addition to witnessing that a transaction occurred or recording a transaction (write, read, modify, delete, move, etc.), embodiments of the invention allow both the client 102 and the cloud object store 104 to acknowledge the transaction and to acknowledge the state of the object and to potentially agree to various obligations regarding the object 108. This may be achieved using a smart contract.

In one example, the ledger 106 effectively allows the cloud object store 104 to verify that the object 108*b* is identical to the object 108*a*. Both the client 102 and the cloud object store 104 may make an entry in the ledger 106 related to the transaction or may enter information into the relevant ledger entries. As discussed herein, the client 102 may indicate that a transaction was performed with respect to an object and may identify or provide an identifier of the object 108. The cloud object store 104 may make an entry in the ledger 106 verifying that the object 108 was received and that the object received is the object uploaded. This is achieved using a fingerprint or other identifier of the object, such as a hash. If the cloud object store 104 generates a fingerprint of the object that matches the fingerprint provided by the client 102, the object 108*a* is the same as the object 108*b* and both the client 102 and the cloud object store 104 know that the object was successfully received by the cloud object store 104. This effectively prevents the cloud object store 104 from asserting that a corrupted object 108 was uploaded and prevents the client 102 from asserting that the object was corrupted in the cloud object storage 104.

Figure 2:
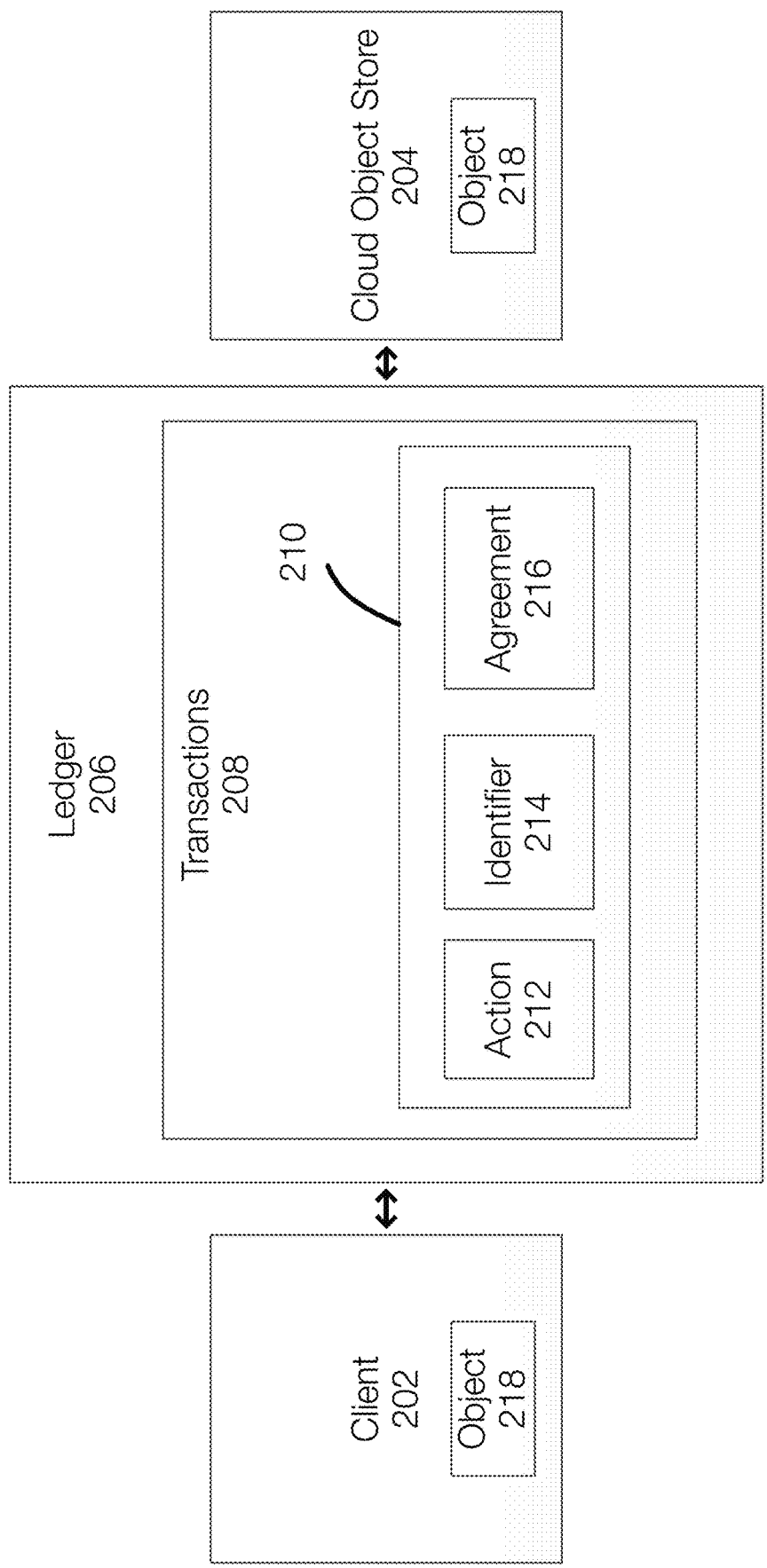
FIG. 2 illustrates an example of a distributed ledger that records transactions and that attests to objects that are related to the recorded transactions.

FIG. 2 illustrates an example of a ledger 206 used by a client 202 and a cloud object store 204. The ledger 206 stores transactions, which may include smart contracts. Each transaction may include a record of an action performed with respect to the client 202 and the cloud object store 204). An example transaction 210 includes information such as an action 212 (e.g., read, write, delete, copy, etc.), an identifier 214, and/or an agreement 216.

The identifier 214 may include an identifier (e.g., a hash or other fingerprint) of the object 218. For example, the client 202 may generate a hash of the object 218 and record the hash in the transaction 210. The cloud object store 204, after receiving the object 218, can generate the identifier from the object, for example by performing the same hash. If the hash generated by the cloud object store 204 matches the hash provided by the client 202, then both the client 202 and the cloud object store 204 know that the object 218 stored in the cloud object store 204 is identical to the object uploaded by the client 202. This is further acknowledged in the ledger 208. For example, the transaction 210 may include space for acknowledgments or signatures or other indications of acknowledgement or agreement.

In one example, the agreement 216 may include an acknowledgement from the cloud object store 206 that the cloud object store 206 has the object 218 in an acceptable form (e.g., identical to what was uploaded). The agreement 216 may also include a retention policy and/or availability requirements and/or remedies. This agreement 216 effectively constitutes a service level agreement (SLA) with regard to the object 218. The retention policy may specify how long the object 218 is to be stored, the availability may indicate how available the object 218 is to be, and the remedy may specific a predetermined penalty (e.g., a fine, a refund, etc.) if the agreement 216 is violated. The penalty may depend on the magnitude of the violation. A corrupted object that is still usable is different, for example, from a missing object.

Figure 3:
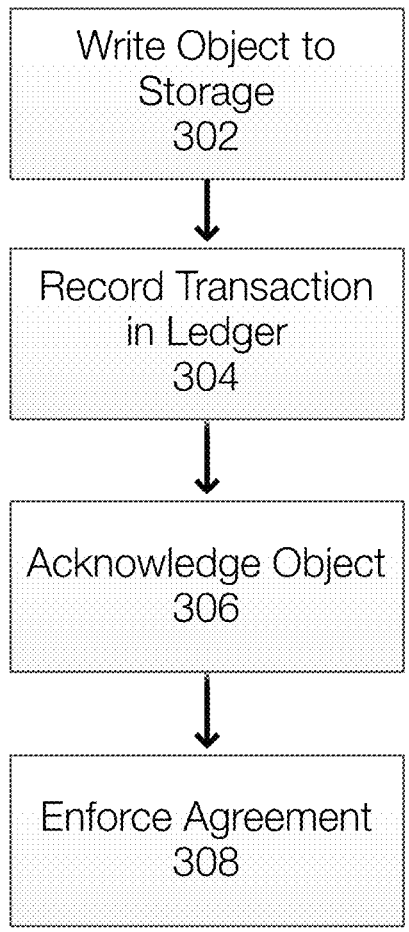
FIG. 3 illustrates an example of a method for writing an object to an object store using a distributed ledger.

FIG. 3 illustrates an example of a method for storing an object in a cloud object storage. In FIG. 3, an object is written 302 to storage in a cloud storage. Embodiments of the invention contemplate other scenarios other than a cloud storage. For example, embodiments of the invention could be implemented in a local area network that includes network storage.

When the object is written to the cloud object storage, the transaction is recorded 304 is a ledger or in a distributed ledger. The transaction may identify or include the action performed, an identifier of the object, and/or an agreement. The agreement may already be part of the ledger and be assumed or attached to all transactions. The identifier can be generated in a repeatable manner and can be applied to unencrypted objects and encrypted objects. The identifier is a way to uniquely identify the corresponding object.

The cloud object storage may then acknowledge 306 the object. Acknowledging the object may include verifying the object, for example by generating the identifier from the written object and comparing the identifier with the identifier recorded in the ledger by the client. A match indicates that the object has been successfully received. If a match is not present, this may also be committed to the ledger such that, in a verifiable way, the cloud object storage can assert that the object presumably uploaded by the client was not received or that the object provided by the client is corrupted or does not correspond to the identifier. Acknowledging the object may optionally include agreeing to an agreement with regard to the object (e.g., retention period, availability, etc.). If the identifiers match, the client may be able to upload the object again. In one example, the client may be notified to reload the object.

When and if a problem subsequently arises, the agreement may be enforced 308. Enforcement of the agreement can be performed by the cloud object storage and/or the client and/or by a third party service. For example, the client may assert that the cloud object store did not properly store the object and allowed the object to be corrupted. The cloud object storage may assert than the original object or uncorrupted object was never received. The ledger allows this situation to be resolved. A review of the object in the cloud storage and the ledger can determine whether the object was uploaded correctly or whether the object became corrupted at the cloud object storage.

Figure 4:
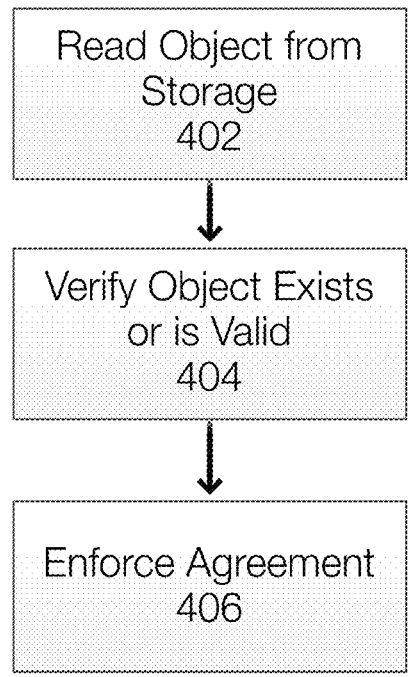
FIG. 4 illustrates an example of a method for reading an object from an object store using a distributed ledger.

Similarly, a client's assertion that an object is missing can be resolved using the ledger. The ledger may be used to determine that the object was uploaded and that there is no subsequent delete command and, in one example, that the object storage guarantee time has not passed (the contract can be for storing for 1 year for example). Thus, embodiments of the invention allow multiple aspects of the agreement to be considered such as client commands, storage provider actions, agreement storage terms, and the like FIG. 4 illustrates an example of a method for reading an object from a cloud object store. Initially, an object is read 402 from the cloud object storage (or storage). Next, the object is verified 404. This may include determining that the object is missing. Verifying the object may also include comparing an identifier of the read object with the identifier associated with the object in the ledger. A match verifies the object while a mismatch indicates a problem. The agreement is enforced 406 in accordance with the specifics of the problem as discussed herein.

Figure 5:
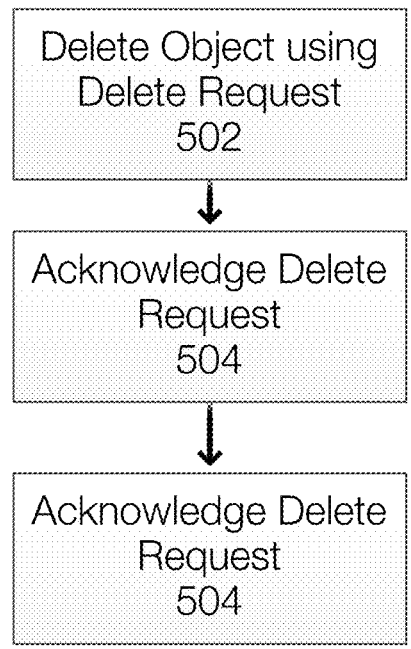
FIG. 5 illustrates an example of a method for deleting an object from an object store using a distributed ledger.

FIG. 5 illustrates an example of a method for deleting an object. A delete object request may be received 502 by the cloud object storage and/or by the ledger. Next, the delete request is acknowledged 504. Delete requests or other requests in the ledger may be serviced asynchronously by the cloud object store. As previously stated, the delete request may include the object's identifier. The cloud object storage may then delete 506 the object asynchronously or in a batch mode by identifying delete requests in the ledger in batches, or the like. The ledger allows the cloud object storage to verify that the correct object is being deleted using the identifier.

In general, the distributed ledger allows the transactions recorded therein to reflect both the action and attest to the object. For various actions, the object can be identified as necessary, for example by using the identifier or fingerprint of the object and the identifier or fingerprint recorded in the ledger. The ledger helps ensure that delete requests are performed on the correct object, that objects written to the cloud object store are successfully written, and that read requests retrieve the correct object.

Whenever an error arises (the object is corrupted, cannot be found, is not actually deleted, etc.), the ledger allows the transactions that relate to the objects associated with the errors to be reviewed in a manner that allows the source of the error to be determined. As a result, appropriate action can be taken based on the source of the error.

Embodiments of the invention thus allow data to be stored correctly, read correctly, deleted correctly, or the like in a manner that holds both the clients and the cloud object storage accountable for their actions.

It should be appreciated that the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for protecting data stored in an object storage, the method comprising:
    performing a transaction with an object to the object storage by a client with regard to an object;
    recording a transaction in a ledger for the object by the client such that the ledger attests to the transaction and to the object, wherein the transaction includes an action performed on the object and an identifier of the object;
    receiving an acknowledgement from the object store, wherein the acknowledgement indicates that an identifier of the object generated by the object store matches the identifier of the object provided by the client;
    logging the acknowledgement from the object store in the ledger, wherein the transaction further comprises an agreement that is accepted by the object storage or by a provider of the object storage when the acknowledgement is logged and wherein the agreement specifies a penalty;
    receiving a delete request to delete the object into the ledger from the client, wherein deletions are included in the agreement;
    servicing the delete request by the object store by deleting the object, wherein the identifier in the ledger and associated with the delete request ensures that the object store understood which object to delete; and
    automatically performing the penalty when the agreement is broken.

2. The method of claim 1, further comprising performing a write to the object storage.

3. The method of claim 1, further comprising reading the object from the object store after the object is stored, wherein the transaction is used to verify the object being read.

4. The method of claim 1, further comprising deleting the object from the object store.

5. The method of claim 4, further comprising entering a delete request transaction into the ledger such that the ledger attests to the delete request.

6. The method of claim 1, wherein the agreement is enforced at least by determining which of the client and the object storage is at fault based on information stored in the ledger.

7. The method of claim 6, wherein the transaction comprises a smart contract between the client and the object storage or between a user and the object storage provider.

8. A method for writing an object to a cloud object storage, the method comprising:
   writing the object to the cloud object storage by a client;
   recording a transaction in a ledger reflecting that the object was written to the cloud object storage, wherein the transaction attests that the object was written to the cloud object storage and includes an identifier of the object and is associated with an agreement that specifies an availability of the object;
   receiving an acknowledgement from the object store, wherein the acknowledgement indicates that an identifier of the object generated by the object store matches the identifier of the object provided by the client and wherein the acknowledgement constitutes acceptance of the agreement;
   receiving a delete request to delete the object into the ledger from the client, wherein deletions are included in the agreement;
   servicing the delete request by the object store by deleting the object, wherein the identifier in the ledger and associated with the delete request ensures that the object store understood which objects to delete; and
   enforcing the agreement by applying a penalty when determining that the agreement regarding the object is broken.

9. The method of claim 8, wherein the object is encrypted.

10. The method of claim 8, further comprising reading the object from the object store after the object is stored, wherein the transaction is used to verify the object being read by comparing an identifier of the object being read with the identifier included in the ledger.

11. The method of claim 8, further comprising deleting the object from the object store in a second transaction, wherein the second transaction includes a delete request and the identifier of the object to be deleted.

12. The method of claim 11, wherein the delete request is performed asynchronously.

13. The method of claim 8, wherein the ledger comprises a distributed ledger that is trusted or untrusted.

14. The method of claim 8, further comprising enforcing the agreement, wherein the agreement is enforced at least by determining which of the client and the object storage is at fault based on information stored in the ledger, wherein the agreement is enforced by an enforcement computer that accesses the ledger and the object.

15. The method of claim 8, wherein the transaction is associated with a private key of the client to verify an identify of the client.

16. A non-transitory computer readable medium comprising instructions that, when executed, perform the method of claim 8.

17. A non-transitory computer readable medium comprising instructions that, when executed by a processor, perform a method comprising:
   performing a transaction with an object to the object storage by a client with regard to an object;
   recording a transaction in a ledger for the object by the client such that the ledger attests to the transaction and to the object, wherein the transaction includes an action performed on the object and an identifier of the object;
   receiving an acknowledgement from the object store, wherein the acknowledgement indicates that an identifier of the object generated by the object store matches the identifier of the object provided by the client;
   logging the acknowledgement from the object store in the ledger, wherein the transaction further comprises an agreement that is accepted by the object storage or by a provider of the object storage when the acknowledgement is logged and wherein the agreement specifies a penalty;
   receiving a delete request to delete the object into the ledger from the client, wherein deletions are included in the agreement;
   servicing the delete request by the object store by deleting the object, wherein the identifier in the ledger and associated with the delete request ensures that the object store understood which object to delete; and
   automatically performing the penalty when the agreement is broken.

* * * * *